United States Patent [19]
Baxter

[11] Patent Number: 4,968,771
[45] Date of Patent: Nov. 6, 1990

[54] WOOD ADHESIVES MODIFIED WITH SURFACE ACTIVE AGENTS

[75] Inventor: Gene F. Baxter, Decatur, Ga.

[73] Assignee: Georgia-Pacific Resins, Inc., Atlanta, Ga.

[21] Appl. No.: 422,517

[22] Filed: Oct. 17, 1989

[51] Int. Cl.$^5$ ............................................... C08G 4/00
[52] U.S. Cl. ................................... 528/230; 528/232; 528/256; 528/259; 528/270; 528/219; 524/376; 524/377
[58] Field of Search ............... 528/230, 232, 256, 259, 528/270, 219; 524/376, 377

[56] References Cited

U.S. PATENT DOCUMENTS

| | | | |
|---|---|---|---|
| 3,342,776 | 9/1967 | Lambuth | 528/147 |
| 4,150,194 | 4/1979 | Watts | 428/531 |
| 4,572,859 | 2/1986 | Fushiki et al. | 428/215 |
| 4,594,372 | 6/1986 | Notav et al. | 523/208 |
| 4,699,824 | 10/1987 | Pufahl | 428/220 |

FOREIGN PATENT DOCUMENTS

| | | | |
|---|---|---|---|
| 754646 | 3/1967 | Canada | 400/80 |
| 60/135471 | 7/1956 | Japan . | |

OTHER PUBLICATIONS

Horioka et al., "Researchers for the Improvement of Wood Study on the Mechanism of Adhesion", Jap. Forest Exp. Stn. Bull., (1956), 89:1-55.

Herczeg, "Wettability of Wood", Forest Prod. J., (1965), 15:499-505.

Hse, "Properties of Phenolic Adhesives as Related to Bond Quality in Southern Pine Plywood", Forest Prod. J. (1971), 21:44-52.

Hse, "Surface Tension of Phenol-Formaldehyde Wood Adhesives", Holzforschung (1972), 26:82-85.

Eblez, "Etude de la Mouillabilite du Bois", Holzforschung (1978), 32:82-92.

Rowell, "Adhesive Bonding of Acetylated Aspen Flakes", Int. J. Adhesion Adhesives (1987), 7:183-188.

Youngquist et al., "Adhesive Bonding of Acetylated Aspen Flakes", (Abstr. 8747), Int. J. Adhesion Adhesives (1988) 8:197-200.

*Primary Examiner*—John Kight, III
*Assistant Examiner*—Sam A. Acquah
*Attorney, Agent, or Firm*—Banner, Birch, McKie & Beckett

[57] ABSTRACT

The present invention provides an improved adhesive composition for wood gluing, comprising a formaldehyde condensation resin and a minor amount of a surface active agent. This invention further provides a method for manufacture of composite wood products comprising applying an adhesive composition, which includes a formaldehyde condensation resin and a small amount of a surface active agent, to the wood and curing the adhesive.

5 Claims, No Drawings

WOOD ADHESIVES MODIFIED WITH SURFACE ACTIVE AGENTS

BACKGROUND OF THE INVENTION

1. Field of the Invention

This invention is concerned with the wood gluing art. It provides an adhesive composition and a method for gluing wood veneers and particles together.

2. Description of Related Art

Many approaches to improving the bonding by wood adhesives have been tried. In particular, a number of workers have tried to improve the interaction between the adhesive and the wood surface, and to increase penetration of the adhesive into the wood.

Penetration is important as shown by Rowell (1978), *Int. J. Adhesion Adhesive.* 7:183–8, who looked at surface interactions between wood and adhesive by changing the surface properties of the wood. Aspen wood was acetylated with acetic anhydride then glued with phenolic adhesives. The water-soluble phenolic resin could not penetrate into the acetylated wood's surface, and the reduction in penetration resulted in poor bonding.

Lambuth (1967), U.S. Pat. No. 3,342,776, taught a way of increasing the penetration of phenolic resins to increase bond strength in resultant glue bonds. The initial condensation reaction between phenol and formaldehyde is controlled to maximize addition of formaldehyde to phenol while minimizing the dimerization reaction between substituted phenols. The resulting resin has low viscosity to encourage penetration but cures rapidly, and after curing, the glue joint has improved strength.

Hse (1971), *Forest Prod. J.*, 21:44 52; (1972), *Holzfors.*, 26:82–85, studied the effects of variations in surface tension on glue bond strength in southern pine plywood made with phenolic resins. The surface tension was varied by changing the level of sodium hydroxide catalyst present during the condensation reaction of the resin to change the extent of methylol derivatization of the phenol. The glue bond strength, measured as shear resistance or as wood failure percent, increased as surface tension decreased. However, in these experiments the surface tension property was inextricably confounded with the state of condensation in the phenolic resin. Therefore, it is unclear whether the improved bond strength is really the result of changes in surface tension or whether the true effector is the change in conditions during the condensation reaction. Perhaps as a result, other components to modify surface tension such as surfactants have not been tried with phenolic resins for southern pine plywood.

Eblez (1978), *Holzfors.*, 32:82–92, reported studies with resorcinol adhesives for beech plywood, where the surface tension was modified by addition of low molecular weight aliphatic alcohols. Some improvement in strength was observed on the addition of methanol or isopropanol, although the concentration is unspecified. Addition of benzyl alcohol had no effect on the glue strength. These changes in glue strength seemed to correlate inversely with the wetting ability of the adhesive. In general, as wetting ability of the adhesive mixture increased, the strength of the resulting bond decreased, which argues against using surfactants to change adhesive wetting ability.

Modification of urea-formaldehyde adhesives with surfactants has been attempted, but has not been uniformly successful. Horioka, et al. (1956) *Jap. Forest Exp. Stn. Bull.*, 89:1–55, reported that a small amount of a surface active compound had little or no effect on the bond strength of beech veneer plywood made with urea-formaldehyde adhesive. When plywood panels were soaked before they were tested, presence of a surface active compound in the adhesive decreased the bond strength. When plywood was not pre-soaked before testing, a small amount of surfactant in the adhesive gave some increase in bond strength, while increasing amounts of surfactant lowered bond strength.

Herczeg (1965), *Forest Prod. J.*, 15:499–505, used polyoxyethylene sorbitan esters to modify the surface tension of urea adhesives. When these adhesives were used to make plywood, he found the highest bond strength for resins containing 0.025% polyoxyethylene sorbitan esters.

The art of plywood manufacture has long recognized that manufacture of plywood from wet veneers results in poor bonding of the finished products, and similar effects have been observed in other composite wood products manufactured from wood furnish whose moisture content was too high. Adhesives formulated to provide good bonding for veneers with low moisture content (from 0–6%), give poor results when applied to intermediate or high moisture veneer (7–25%), and an adhesive formulated for use with intermediate moisture veneer will not run properly on plywood forming machines set to accommodate low moisture veneers. Wet furnish or veneer tends to cause over-penetration during hot-pressing, so that too little active bonding component is retained at the interface after curing is complete. The excessive flow is caused both by dilution of the adhesive and by retardation of cure, which produces a longer flow period. If particulate extenders are present, they cannot perform their usual function of holding active bonding component such as resin at the interface, and instead become detrimental by further weakening the cured interfacial layer. Many different solutions to the problem of over-penetration have been proposed including both adding modifiers to the adhesive and changing the way the adhesive resins are prepared in order to change the penetration properties of the adhesive.

Kuhr (1967), Canadian Patent No. 754,646, noted when gluing plywood with phenolic resins that the efficacy of bonding is sensitive to the moisture content of the wood and also that using too high temperature during hot press curing of plywood made with high-moisture-content veneer often resulted in steam blisters, damaging the panels. Kuhr taught that the addition of between 0.75% and 4.5% polyvinyl alcohol resin to phenol-formaldehyde adhesive when manufacturing either plywood or chipboard improves stability of the adhesive before pressing, and permits lower press temperatures as well as reduced drying time between applying the adhesive and pressing. Inclusion of polyvinyl alcohol is taught to reduce the sensitivity of the adhesive to variation in initial wood moisture content and to reduce the frequency of steam blisters as a defect.

Most of the techniques available for minimizing over-penetration of adhesive merely shift the emphasis to another manufacturing problem-type. For instance, using higher molecular weight resin will reduce over-penetration but at the expense of reducing the amount of time available between application of the resin and final curing of the glue bond. Addition of a limited amount of vinyl resin to phenolic adhesives, as reported by Kuhr, has relatively few detrimental side effects, so long as the amount of vinyl resin added is small, but as a result the benefit is also limited. There exists a need for adhesive modifiers which reduce over-penetration and which may serve as an alternative to vinyl resins or may be used in an additive fashion with the existing modifiers.

SUMMARY OF THE INVENTION

It is an object of this invention to provide a wood adhesive with improved bonding properties. It is a further object of this invention to provide a method for the manufacture of plywood from high moisture veneers and to provide an adhesive for composite wood products that is effective with high moisture furnishes. It is still another object of this invention to provide a modified adhesive composition for wood that reduces over-penetration. Still another object of this invention is to provide an adhesive modifier for wood adhesive whose effects are additive with modifiers such as vinyl resins. Still another object of this invention is to provide a modified adhesive composition for wood that permits extension of the time between application and curing of the adhesive without drying out, but which is not susceptible to over-penetration that would reduce the strength of final cured glue bonds. These and other objects can be achieved by the invention disclosed herein.

This invention contemplates an adhesive composition comprising a formaldehyde condensation resin and a minor amount of a surface active compound. This invention further contemplates a method for the production of composite wood products which is effective using high moisture furnish. The method comprises application of an adhesive comprising a formaldehyde condensation resin and a minor amount of a surface active compound to the furnish and then curing the adhesive.

In gluing wood laminates or particles, it is sometimes necessary to use high moisture content veneers or furnish, but this tends to cause poor bonding due to over-penetration of the adhesive. The inventor has observed that the incorporation of small amounts of certain surface tension modifiers (surfactants) decreases over-penetration without causing the dryout problems produced by most other modifiers or resin modifications. Experiments have shown that the beneficial effect of the surface active agent is additive to that of, for instance, vinyl resin, so that it is possible by using both modifiers to obtain greater reduction of over-penetration than that which could be achieved with either one separately. Stated another way, the surface active agent seems to broaden the tolerance of a formaldehyde condensation adhesive to moist veneer, whether or not other modifiers are present. It could alternatively also replace more expensive modifiers such as vinyl resin.

DETAILED DESCRIPTION OF THE INVENTION

The adhesive composition of the invention comprises at least two components: a formaldehyde condensation resin and a surface active agent as described below.

The surface active agent is a compound which effects polarity and surface tension of the adhesive composition. The most preferred agent is cetyl alcohol. However, other compounds with related properties are within the contemplation of this invention. These compounds include, but are not limited to, the aliphatic, monofunctional alcohols having between 10 and 25 carbon atoms, especially between 14 and 20 carbon atoms, and the olefinic, monohydroxy alcohols having between 10 and 25 carbon atoms, especially between 16 and 22 carbon atoms. Other compounds which have HLB values similar to these alcohols are also contemplated as surface active agents of this invention, in particular, compounds with HLB in the range from about 1.0 to about 2.0. Examples of such compounds are shown in Table 1.

TABLE 1

| Compound | HLB |
| --- | --- |
| cetyl alcohol | 1.0 |
| oleic acid | 1.0 |
| acetylated sucrose diester | 1.0 |
| ethylene glycol distearate | 1.3 |
| acetylated monoglycerides | 1.5 |
| sorbitan trioleate | 1.8 |
| glycol dioleate | 1.8 |

(Kirk-Othmer Encyclopedia of Chemical Technology, 3rd Ed., Vol. 8, p. 913)

Formaldehyde condensation resins contemplated by this invention are one or more of the condensation resins that are commonly used in the art for gluing wood products. This group includes phenolic novolac and resole resins, urea-formaldehyde resins, melamine-formaldehyde resins, resorcinol-formaldehyde resins, or mixtures of these resins. The resins may be single-stage resins or two-stage resins. Preferred resins are of the phenolic-type, in particular, phenol-formaldehyde resins. The particular resin or resin mixture chosen will be selected in view of the type of wood product in which the adhesive will be used, where the selection criteria are those commonly used to choose resins in the wood-gluing art (including cure speed, water solubility, cost, and durability).

In addition to formaldehyde condensation resins and a minor amount of surface active compound, the adhesive compositions contemplated by this invention may include other additives of the sort used routinely in the art of wood-gluing to modify adhesive properties. Examples of some of the additives contemplated by this invention and the properties they modify are shown in Table 2. In particular, adhesives which contain both the surface active agent of this invention and one or more of the penetration control agents listed in Table 2 will enhance the performance of both modifiers, as shown in the Examples below.

TABLE 2

| Other Modifiers |
| --- |
| Viscosity control agents |
| *extenders (absorb water) |
| sodium hydroxide (swells the extenders) |
| gums (natural gums and modified cellulose) |
| Penetration control agents |
| polyvinyl alcohol (limits depth of penetration) |
| polyvinyl acetate (limits depth of penetration) |
| *extenders (hold resin fractions at interface) |
| gums (raise viscosity) |
| borates, chromates, etc. (form complexes with resin) |
| Cheapeners |
| *extenders |
| alkali metal silicate salts |
| lignin |
| lignosulfonate |
| Strengtherners (may make cured film less brittle) |
| *extender |
| latex |
| isocyanate resin |
| Tackifiers |

TABLE 2-continued

Other Modifiers gums
latexes
borates, chromates, and other salts
Curing Agents (catalysts to accelerate curing)
polyhydroxy benzenes
aromatic amines
aminophenols
ketone-aldehyde resins
alkylene carbonates

*argricultual residues, wood flour, nut shell flour, cereal flour, clays etc.

The surface active agents of this invention, in an amount sufficient to enhance bond strength after curing, are combined with aldehyde condensation resins, and optionally other modifiers, to make up the adhesives of this invention. The surface active agents of this invention are usually added to the adhesive composition in an amount whereby the agent will be sufficient to coat the surface of the glue layer after it is applied to the wood material. The surface active agent should preferably make up from 0.01%–0.2%, and especially from 0.02%–0.08%, of the final adhesive weight. The formaldehyde condensation resin solids are present in the adhesive composition at from about 25% to about 60% of the total weight of the adhesive. In plywood adhesives, the resin is present at preferably from about 25% to about 30%. The resultant adhesives are used by directly substituting them for the adhesives routinely used to glue composite wood products in production process well-known to those skilled in this art.

The modified resin adhesives of this invention are particularly useful in the manufacture of plywood from southern pine veneers. Especially preferred for this application are resole resins. A typical resole for plywood is in the range of 40–45% total solids, 5–8% NaOH, and 1.9–2.3 F/P mole ratio. The NaOH is added in 2 or 3 portions at various stages of the resin synthesis.

This invention also contemplates a method for the manufacture of gluded wood products comprising using the adhesives of this invention to bond wood veneers or wood particles together. Composite wood products which may be manufactured using the adhesive composition contemplated by this invention include softwood plywood, hardwood plywood, oriented strand board, chipboard, hardboard, particle board, fiberboard and LVL (laminated veneer lumber). Also within the contemplation of this invention are phenolic or aminoplast molding compositions comprising resin, wood flour filler and a minor amount of a surface active compound.

The processes of manufacture of softwood plywood, hardwood plywood, oriented strandboard, chip board, hardboard, particle board, fiberboard, and LVL are well-known to those of ordinary skill in the art and fully discussed in the literature. In the method contemplated by this invention, the adhesive of this invention, comprising a formaldehyde condensation resin and a minor amount of surface-active agent, is substituted for the adhesive of the prior art. Other changes in the process comprise only minor adjustments of process variables to optimize the process, and are routine matters within the skill of the ordinary worker.

In a particular embodiment, this invention contemplates a manufacturing process for plywood comprising southern pine veneers in which the veneer may have a moisture content from 0–25%, preferably from 5–15%. The adhesive of this invention permits use of veneers with a range of moisture content in contrast with the prior art adhesives which are restricted to moisture levels of either less than 7%, or alternatively between 7 and 12%. A modified plywood adhesive composition comprising a formaldehyde condensation resin and a surface active agent (surfactant) is applied to the veneers, which are formed together and pressed at a temperature of from about 285° to 350° F. for a pressed-cycle time of from about 2.5 to 4.5 minutes for 3-ply ½-inch construction. Press times will vary for other constructions.

The adhesive compositions, and methods for using them, provided by this invention are further described in the subsequent Examples which are provided only to examplify the practice of the invention. They are not intended to limit the scope of the invention as disclosed herein.

EXAMPLE 1:

This example shows the effects of polyvinyl acetate and cetyl alcohol in wet veneer gluing.

The base adhesive described in Table 3a was modified by the addition of polyvinyl acetate, cetyl alcohol, or both, as described in Table 3b. The adhesive was applied to three-ply, ⅜" southern pine plywood panels at glue spreads of 75–81 lbs/MDGL, on 15.3%–15.8% average moisture content veneers. The plywood panels then stood for 15–17 minutes before four minutes pre-press at 150 psi. The total assembly time was 60–62 minutes. The hot press cycle included one minute pre-cure and four minutes hot press at 200 psi 300° F. and was followed by 15 hours in hot stack.

The wood failure data in Table 3b indicates poor bonding of the high moisture veneers with control adhesive. Addition of either polyvinyl acetate or cetyl alcohol results in substantial improvement, and most significantly, a combination of both adhesives results in further improvement over either additive alone.

TABLE 3

Effects of Polyvinyl Acetate and Cetyl Alcohol in Wet Veneer Gluing

| (a) | Adhesive Composition |
|---|---|
| | 9.33% water |
| | 8.77% 5% borax |
| | 64.36% resin* |
| | 4.81% Phenofil |
| | 4.67% Plybond wheat flour |
| | 2.12% 50% NaOH |
| | 5.94% curing agent |

| (b) | Results | % Wood Failure by V-P Test |
|---|---|---|
| 1. | Control. | 54.3 |
| 2. | PVA. 1% Polyvac 16 emulsion is added to resin. | 67.5 |
| 3. | Cetyl Alcohol. 0.45% cetyl alcohol is added to curing agent | 66.5 |
| 4. | PVA and Cetyl Alcohol. Resin is same as in 2; curing agent is same as in 3. | 76.3 |

*Resin is a 2.2 F/P mole ratio phenolic resin with 43.0% solids and a viscosity of 628 cps.

EXAMPLE 2:

This example shows the results of varying dose levels of cetyl alcohol.

Cetyl alcohol is added, at the dose levels indicated in Table 4b, to the phenolic plywood adhesive described in Table 4a. Three-ply, ⅜" southern pine plywood panels were prepared using these adhesives at 81–88 pounds/MDGL on veneers of the moisture content indicated in Table 4. Plywood from the low moisture veneers stood for five minutes before pre-press while plywood from 7.1% and 10% moisture content veneers stood for ten minutes before pre-press. The press cycle included four minutes pre-press at 150 psi, and 3.2 minutes hot press at 200 psi, 330° F. The hot stack hold was for 16 hours. Total assembly times (TAT) for each veneer are also shown in Table 4.

Cetyl alcohol provided a benefit in increased percent wood failure levels for each type of plywood prepared. However, the benefits of cetyl alcohol are much more apparent in the high moisture veneer plywoods. It is also apparent from Table 4 that the benefits of cetyl alcohol addition are achieved by a small addition of the compound, since the highest wood failure levels occurred where the adhesive contained from 0.03–0.06% cetyl alcohol. Further addition of cetyl alcohol above this level results in less benefit.

TABLE 4

Gluing Results with Several Levels of Cetyl Alcohol

| (a) Adhesive Composition | Parts by Weight |
|---|---|
| GP-553 resin* | 67.00 |
| Water | 14.68 |
| Co-Cob (Dehyco Co. extender) | 9.16 |
| Plybond wheat flour | 5.50 |
| 50% NaOH | 3.66 |
|  | 100.00 |

| (b) Results | % Wood Failure by V-P Test | | | |
|---|---|---|---|---|
| % Cetyl Alcohol: | 0 | 0.03 | 0.06 | 0.09 |
| Production Conditions | | | | |
| 20 min. TAT, 4.8% veneer m.c. | 83.0 | 89.5 | 92.3 | 94.0 |
| 20 min. TAT, 10.0% veneer m.c. | 63.8 | 98.8 | 98.0 | 63.3 |
| 60 min. TAT, 4.8% veneer m.c. | 93.8 | 97.3 | 96.3 | 91.3 |
| 60 min. TAT, 10.0% veneer m.c. | 85.0 | 99.0 | 97.8 | 87.0 |
| 120 min. TAT, 7.1% veneer m.c. | 97.0 | 99.3 | 99.0 | 97.5 |
| Average | 84.5 | 96.8 | 96.7 | 86.6 |

*Cetyl alcohol, when used, was pre-dissolved in methanol and added to the GP-553 resin using a high shear mixer. GP-553 is a southern pine plywood resin marketed by Georgia-Pacific Resins, Inc.

EXAMPLE 3:

This example shows that cetyl alcohol addition in beneficial for adhesives prepared from a mixture of phenolic and melamine condensation resins.

Melamine-formaldehyde and phenol-formaldehyde condensation resins were combined with extenders, water, and modifiers to produce adhesive compositions that differed only in the Adhesive A contained no cetyl alcohol and Adhesive B contained 0.017% cetyl alcohol. These adhesives were used in the preparation of three-ply, ⅜" southern pine plywood with 4–6% veneer moisture content, 78–86 #/MDGL spread, a ten-minute stand time before prepress, a four-minute prepress at 150 psi, a one-minute precure, a 2½-minute hot-press at 33° F., and a 16-hour hot stack prior to testing. The APA vacuum-pressure test results are given in Table 5.

TABLE 5

| | % Wood Failure by V-P Test | |
|---|---|---|
| | Adhesive A (control) | Adhesive B (+ cetyl alcohol) |
| 30-minute total assembly | 88.3 | 96.8 |
| 60-minute total assembly | 86.5 | 94.5 |

I claim:

1. In a composite wood product adhesive composition containing a formaldehyde condensation resin, said composition containing about 0.01 to 0.2% of a surface active compound having an HLB of from about 1.0 to about 2.0.

2. The composition of claim 1 where the formaldehyde condensation resin is selected from the group consisting of phenol-formaldehyde resins, resorcinol-formaldehyde resins, melamine-formaldehyde resins, urea-formaldehyde resins, and mixtures of these resins.

3. The composition of claim 1 where the formaldehyde condensation resin comprises from 25 to 60% of the composition based on resin solids.

4. The composition of claim 1 where the surface active compound is selected from the group consisting of aliphatic alcohols containing from 10 to 24 carbon atoms and olefinic alcohols containing from 12 to 24 carbon atoms.

5. In an adhesive for gluing wood products comprising phenol-formaldehyde resin solids at from 25–60% of the total adhesive weight, said adhesive containing cetyl alcohol at from 0.01 to 0.2% of the total adhesive weight.

* * * * *